May 22, 1928.
C. H. WHITE
1,670,393
DISK HARROW
Original Filed July 5, 1924  4 Sheets-Sheet 1
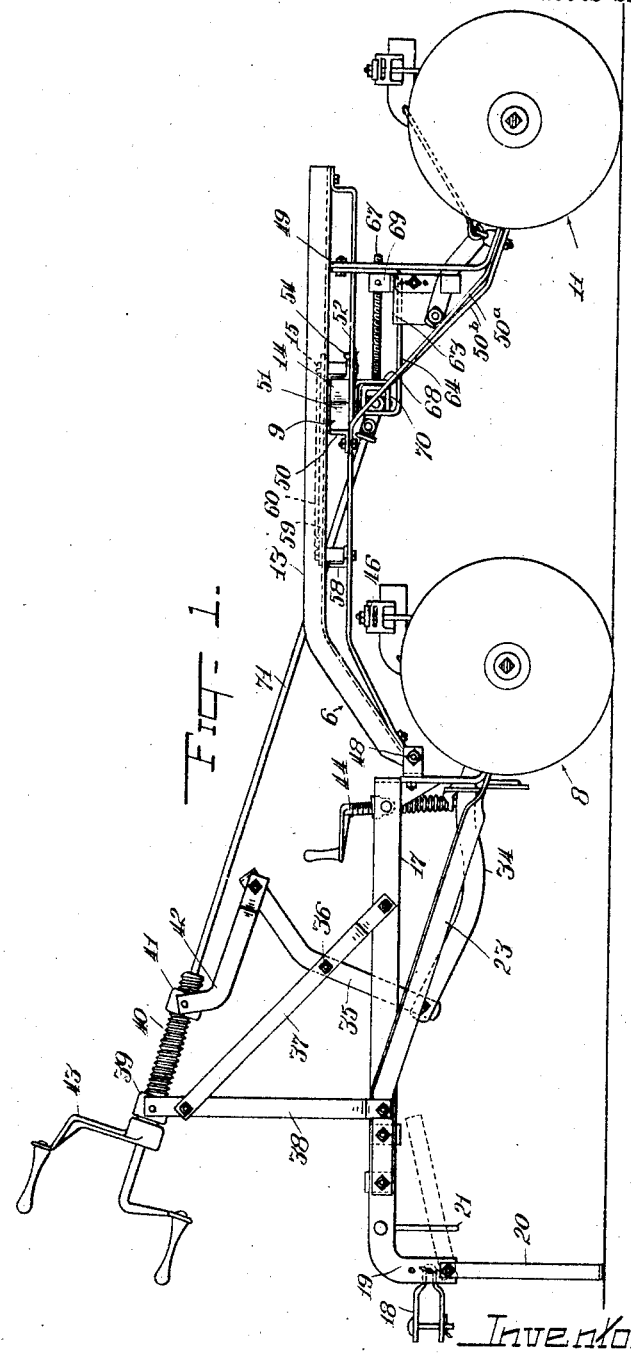
Inventor;
Charles H. White,
By John L. Jackson,
Attorney
Witness;
E. Wilderson May 22, 1928. 1,670,393
C. H. WHITE
DISK HARROW
Original Filed July 5, 1924  4 Sheets-Sheet 2
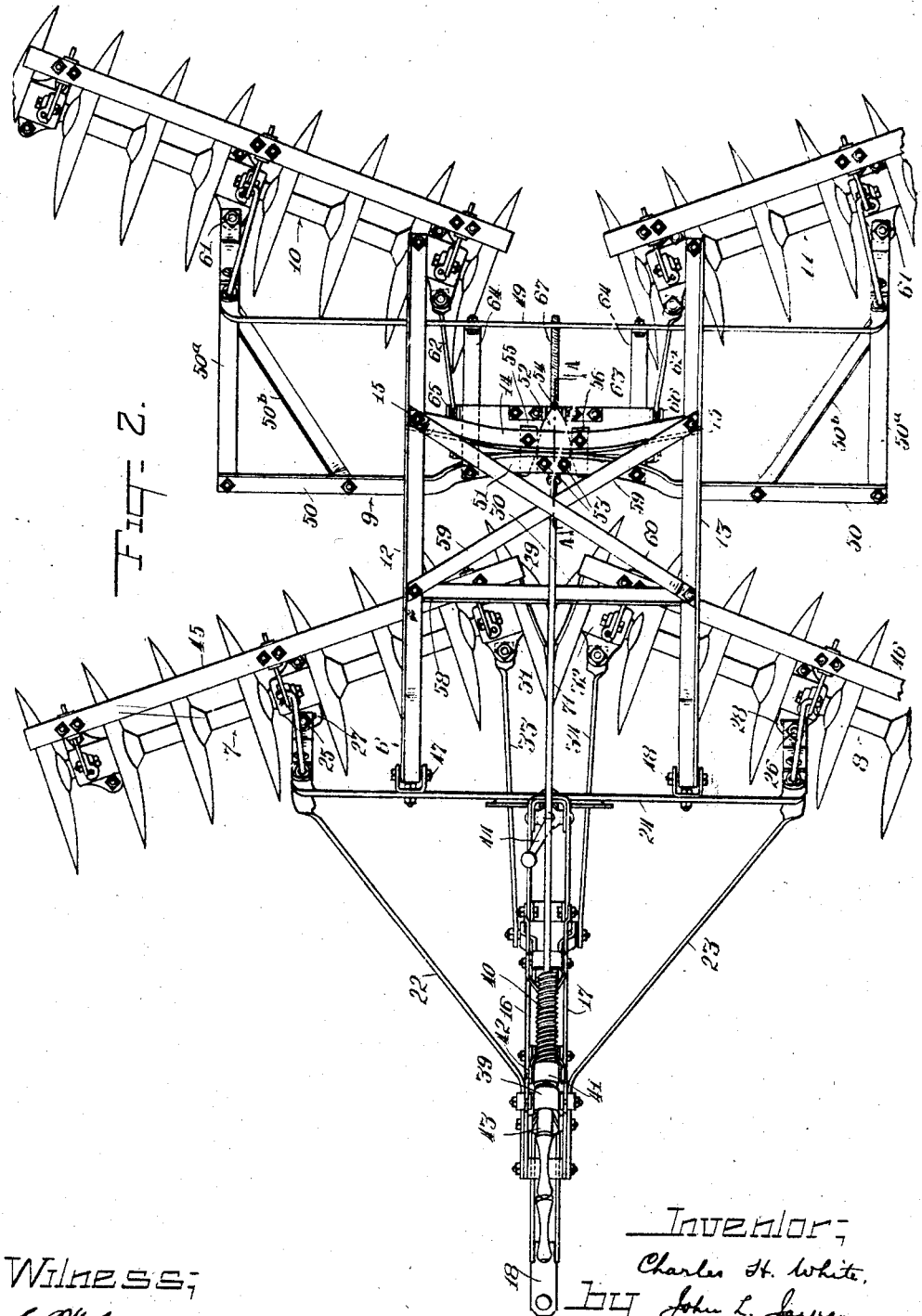

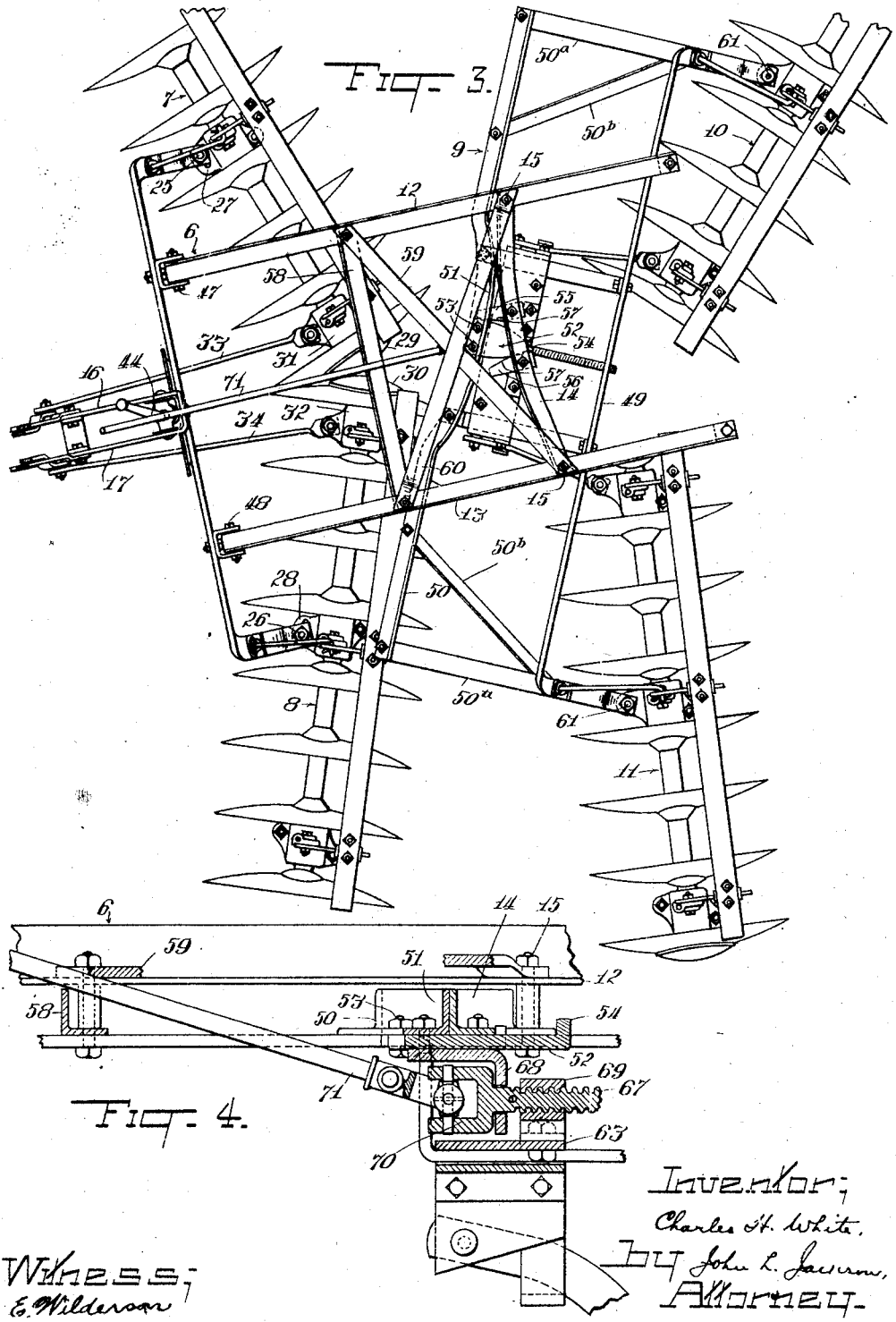

May 22, 1928.                 C. H. WHITE                  1,670,393
                              DISK HARROW
                 Original Filed July 5, 1924    4 Sheets-Sheet 4
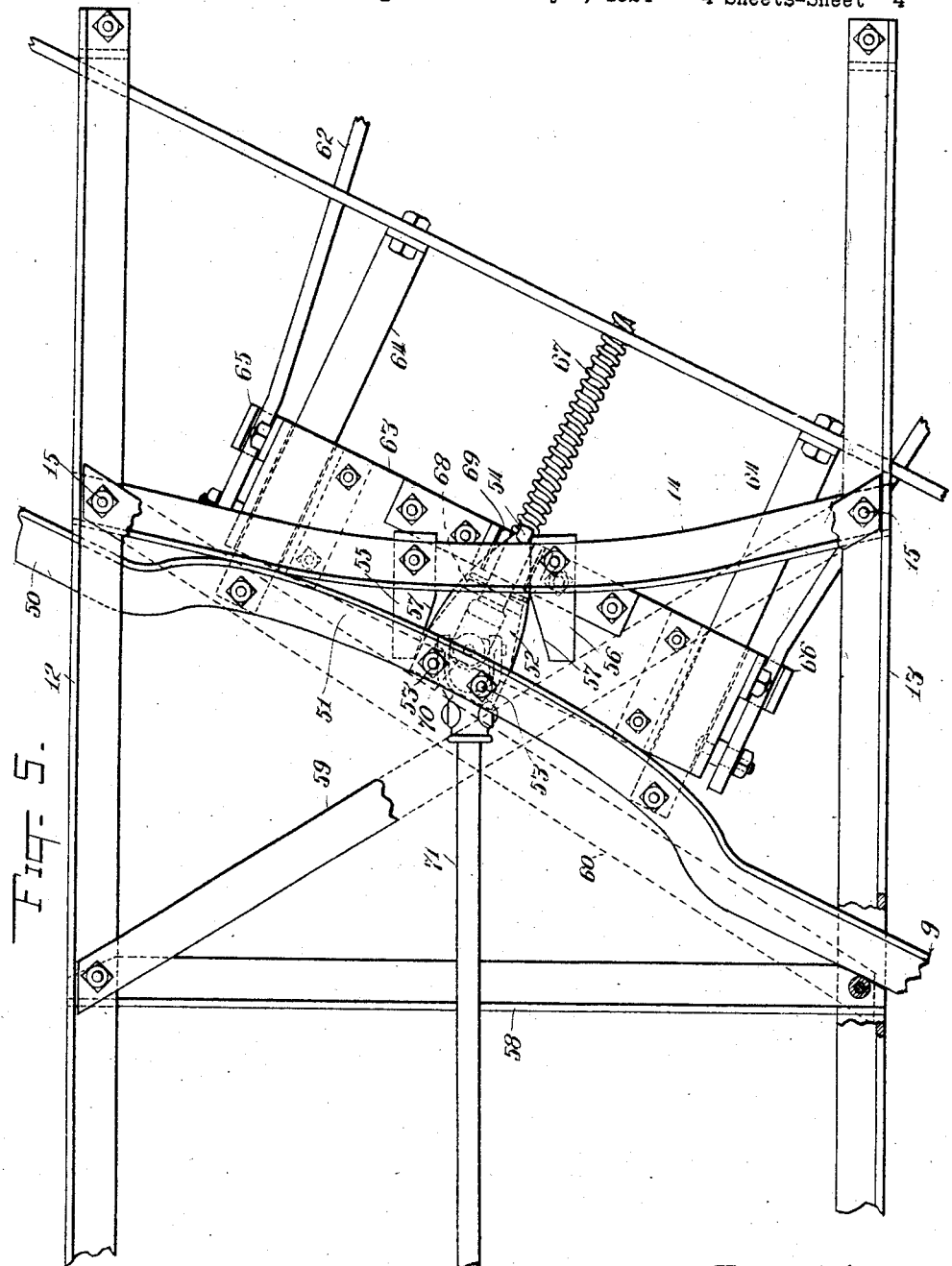

Patented May 22, 1928.

1,670,393

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK HARROW.

Application filed July 5, 1924, Serial No. 724,530. Renewed October 29, 1927.

My invention relates to tandem disk harrows, or disk harrows comprising front and rear sections each composed of a pair of disk gangs so mounted that they may be turned into a position of alinement for transport purposes, which is their inoperative position, or may be turned into angular relation to each other, which is their operative position.

In harrows of the tandem type the rear section is drawn through the front section, with which the draft power, either a team or a tractor, is connected, and it has been largely the custom to connect the rear section flexibly with the front section so as to permit the front and rear units or sections to swing laterally relatively to each other for convenience in driving around trees or other obstacles, or in turning corners, as well as to permit vertical movement of either or both of the rear gangs relatively to the gangs of the front section, but a serious objection to flexibly connected tandem disk harrows as heretofore constructed is that they have not been equipped with adequate means for so controlling the position of the rear harrow section that each of the disks of the rear gangs will always work in the ridge left between the furrows turned by the pair of front disks behind which it is set, or, in other words, will not run into or across one of such furrows and thereby leave some portion of the ridge between them unturned. This relation of the disks of the rear gangs to those of the front gangs may appropriately be termed "registration", and the maintenance of registration in a disk harrow of the tandem flexibly connected type on straight-away work, and also when turns are made, so that the ridges left between the front disks will be properly cut at all times, and, in making turns, the rear gangs cannot by swinging in on the turn damage trees or strike obstacles that have been avoided by the front gangs, is a result which those skilled in the art have for many years sought to accomplish, but which prior to the invention of Frederick E. Hand, for which he has made application for Letters Patent, filed of even date herewith, has never been realized in a practical way. In the operation of flexibly connected tandem disk harrows the front section is steered, and held against any considerable oscillation about a vertical axis, by the draft power, but the rear section, being pivotally connected to the front section, in the absence of adequate controlling means is free to oscillate or swing laterally about a vertical axis independently of the front section when the disks of the opposite rear gangs encounter unequal resistance, which swinging shifts the disks from their normal registering position with relation to the disks of the front gangs. The condition of an unopposed tendency of the rear harrow section to so swing laterally, which may be termed "nervousness", is highly objectionable, as in order to properly perform their work the disks of the rear section should be held steady and maintain their registering position, and this is particularly desirable in turning, and also in side hill work, where a nervous harrow has a strong tendency to side-slip or "drift," and so get out of registration. Many constructions have heretofore been proposed to cure this nervousness and obtain stability, but while some of such attempts have been measurably successful so far as relieving nervousness on straight-away work is concerned, with the exception of said Hand invention it has been done at the expense of flexibility, and of maintaining registration on curves, or on turns to avoid obstacles.

According to said Hand invention, the objections to prior constructions are avoided and the desired results obtained by causing the draft force to operate as a positive factor in maintaining registration and overcoming nervousness by opposing oscillation or lateral swinging of the rear harrow section independently of the front section, and by directly aiding in the restoration of the rear section to its normal operative position when a straight-away course is resumed after a turning movement. In the harrow illustrated and described in said Hand application, this is accomplished by providing the front and rear harrow units with transversely disposed curved members in the form of bars secured to or forming a part of the frames of said units respectively, the curved member connected with the front frame being in rear of that connected with the rear frame, so that a pushing force is applied to the rear frame by the front frame. The curved members referred to are convex, and when the harrow units are in their normal position, as for straight-away work, the point of contact between them lies in the median line of the harrow and preferably at a point midway between the transverse axes of said units. By this arrangement when the front unit is turned in either direction, as in turning corners or avoiding obstacles, the transverse axes of said units are angled relatively to each other so that they converge toward the center of the circle along an arc of which the turn is being made, and consequently the disks of the rear gangs may maintain their proper registering relation to the disks of the front gangs. At the same time the point of application of the draft of the rear unit will be shifted inversely laterally or away from the center of the circle, and as in making a turn the center of load represented by the rear unit shifts toward the outside of the curve, the point of application of the draft to the rear unit shifts in the same direction as the center of load, and the draft therefore operates effectively to restore the rear unit to its normal or straight-away position. In like manner, when the harrow is traveling straight ahead, whenever the rear unit swings laterally with reference to the front unit, owing to unequal resistance encountered by the disks at opposite sides of the median line of the harrow, the point of contact between said curved members shifts in the same direction as the center of load, or toward the lagging side of the rear unit, and therefore the draft operates to resist such lateral swinging of the rear unit and to restore it to its normal position. In the harrow illustrated in said Hand application the curved members above referred to are held against endwise movement with relation to each other, and are also held in engagement with each other when backing the harrow, by means of a pair of crossed links having their rear ends connected with the frame of the front unit and their forward ends connected with the frame of the rear unit, said links being coordinated with the curvature of the curved members so that they do not interfere with their operation in the manner above indicated.

My present invention has to do with a harrow of similar construction to that disclosed in said Hand application so far as the use of the curved member is concerned, and it has for its object to provide improved means for holding said curved members in proper relation to each other under normal operating conditions, as well as when backing the harrow. This object I accomplish as illustrated in the accompanying drawings and as hereinafter described. What I regard as new is set forth in the claims.

In the accompanying drawings,—

Fig. 1 is a side elevation of my improved harrow with the gangs in transport position;

Fig. 2 is a plan view of the principal parts of the harrow, some parts being broken away, and the front and rear units or sections being shown in their normal operating position, i. e., the position they occupy for straight-away work;

Fig. 3 is a similar view showing the position of the parts when the harrow is being turned to the left;

Fig. 4 is an enlarged detail, being a partial longitudinal vertical section on line 4—4 of Fig. 2; and Fig. 5 is an enlarged detail, being a plan view, partly broken away, of the central portion of the harrow as a whole showing the draft connections more in detail in the position they occupy in the illustration of Fig. 3.

Referring to the drawings,—the harrow therein illustrated comprises a front or draft frame designated as a whole by the reference numeral 6, a front harrow section composed of a pair of gangs 7, 8 of any approved type, a rear frame designated as a whole by the reference numeral 9, a rear harrow section composed of a pair of gangs 10, 11, and a draft connection through which the rear harrow section is operatively connected with the front frame so as to be drawn thereby, composed principally of a pair of parallel draft bars 12, 13 connected with the front frame and cross-connected toward their rear ends by a curved bar 14, the ends of which are firmly secured to the draft bars 12, 13, as by bolts 15 shown in Fig. 2. So far as may be necessary to a clear understanding of my invention, the parts above referred to will be more specifically hereinafter described.

The front frame 6 preferably comprises two longitudinally disposed bars 16, 17 spaced apart and suitably braced together, and having at their forward ends a clevis 18 or other suitable means for connecting the harrow to a tractor, or to a team, as may be preferred. In the arrangement shown in the drawings, and particularly in Fig. 1, the forward ends of the bars 16, 17 are bent downward, as shown at 19, and the clevis 18 is secured to this downturned portion, which also has hinged to it a support 20 which may be turned down to the position shown in full lines in Fig. 1 to support the forward end of the front frame, or may be swung back to the position shown in dotted lines in said figure, when it may be held up by a hook 21. Secured to the forward portions of the bars 16, 17 are diagonal braces 22, 23, the rear ends of which are connected with a transverse frame member in the form of a beam 24, which is also secured to the rear end portions of the bars 16, 17. The end portions of the beam 24 are bent downward and backward, and are adjustably connected by vertically disposed bolts 25, 26 with bearing brackets 27, 28 carried by the gangs 7, 8 respectively. The bolts 25, 26 serve as vertical pivots about which the gangs 7, 8 respectively swing when they are adjusted to vary their angular relation to each other. At their inner ends the gangs 7, 8 are provided with the usual end thrust members in the form of convex bearing surfaces 29, 30 which bear against each other, as shown in Fig. 2, and adjacent to their inner ends said gangs are provided with brackets 31, 32 connected respectively by links 33, 34 with a vertically disposed lever 35, by the rocking of which the inner ends of the gangs may be moved forward or backward. The lever 35, which is bifurcated, as shown in Fig. 2, is fulcrumed between its ends on bolts 36 supported by braces 37, the lower ends of which are secured to the bars 16, 17, respectively, while their upper ends are secured to standards 38, as shown in Fig. 1. Pivotally mounted between the upper ends of the standards 38 is a collar 39 through which extends a screw-threaded shaft 40 adapted to rotate therein but held thereby against endwise movement. On said shaft is mounted an internally threaded collar 41 which is pivotally connected by links 42 with the upper ends of the members of the lever 35. A crank 43 on the shaft 40 provides means for rotating it, so that by rotating said shaft the collar 41 may be moved along it, thereby actuating the lever 35 and angularly adjusting the front gangs. The shaft 40 and collar 41 also serve to lock the gangs in their different positions of adjustment. The inner ends of the front gangs may be vertically adjusted to regulate their penetration by means of a crank 44, shown in Fig. 1, in a manner well known to those familiar with the art. The front gangs are provided with the usual horizontal scraper-carrying bars 45, 46, best shown in Figs. 1 and 2. It will be understood that the manner of mounting, and the devices for adjusting, the front gangs have been described merely that the construction illustrated may be fully understood. My invention, however, is not concerned with these specific devices, as the gangs may be mounted in any of the numerous approved ways exemplified in commercial harrows of the tandem type.

The rear harrow section is flexibly connected with the front harrow section so as to be capable of swinging laterally or approximately about a vertical axis, as well as of swinging vertically, and also so as to permit the rear frame to rock to some extent about an axis extending longitudinally of the harrow so that the opposite rear gangs may accommodate themselves to inequalities in the ground, as is usual in harrows of this type. In the illustrated construction these several movements are provided for by means which will now be described. By reference to Figs. 2 and 3 it will be seen that the draft bars 12, 13 are pivotally connected at their forward ends with the transverse beam 24 by horizontal bolts 47, 48, and consequently may swing vertically. Said bars 12, 13, which are preferably made of angle iron, are placed equally distant from and at opposite sides of the median line of the front harrow section, and are held in parallelism with such median line by the curved bar 14, which is symmetrically disposed relatively to said bars with its convex surface toward the front, and is fixedly secured thereto at its ends by the bolts 15. The bars 12, 13, together with the curved bar 14, constitute a supplemental draft frame which is capable of swinging vertically about the pivot bolts 47, 48, and, as will hereinafter appear, the curved bar 14 functions as a rocker bearing through which the draft applied to the front frame is transmitted to the rear frame 9, and through it to the gangs 10, 11 of the rear harrow section. The pivotal connections at the front ends of the bars 12, 13 may be made loose enough to permit either of the rear gangs to rise or fall to some extent independently of the other, so that said gangs may accommodate themselves to inequalities in the ground, or the flexibility of the draft frame may be relied on to permit such movement.

The frame of the rear harrow section comprises a transverse beam 49 which is similar to the beam 24, and is similarly connected to the rear gangs, as will be hereinafter described, and also a bar 50, arranged forward of and preferably parallel with the beam 49 and provided with a curved central portion or member 51, which is preferably an integral part of said bar and extends horizontally across the bars 12, 13 in front of the curved bar 14. The end portions of the bar 50 are rigidly connected with the end portions of the beam 49 by bars 50ª and braces 50ᵇ.

The rearward surface of the member 51 is made convex, its curvature being the same as that of the front surface of the bar 14 against which it is adapted to bear, so that the members 14 and 51 cooperate with each other to form a rocking draft connection between the front and rear frames, and therefore between the draft transmitting devices and the rear harrow section, through which draft force is transmitted to the rear section by a pushing operation. The arrangement is such that when the front and rear harrow sections are in position for straightaway work, at which time the beams 24 and 49 will be parallel with each other, the centers of the convex surfaces of the bar 14 and member 51 will be in contact with each other, and this point of contact will lie in the median line of the harrow. When, however, the harrow sections are swung to an angular position relatively to each other, as in turning the harrow in one direction or the other from a straight-ahead position, the curved bar 14 will swing in the same direction as the front harrow section, and by rocking on the member 51 will cause the point of contact between the convex surfaces of said members to travel toward the side of the harrow opposite that toward which the front section is turned, or, in other words, toward the outside of the curve through which the harrow is being turned. For example, if the harrow is turned to the left, as illustrated in Fig. 3, the front and rear harrow sections will assume a position similar to that illustrated in said figure, and the point of contact between the members 14 and 51 will travel to the right a greater or less distance, depending on the degree of curvature of said members and the sharpness of the turn that is being negotiated by the harrow. A similar shifting of the point of contact of the members 14 and 51 occurs whenever for any reason there is any lateral or angular movement of the harrow sections relatively to each other. As in making a turn, as well as when the rear section swings laterally, the center of load represented by the rear harrow section shifts toward the outside of the curve, or in a direction opposite that in which said section swings, it will be apparent that by the arrangement described under either of such conditions the point of application of the draft to the rear harrow section shifts in the same direction as the center of load, and consequently the draft operates effectively to restore the rear harrow section to its normal or straight-away position. As soon as the latter position is reached, the contacting point of the members 14 and 51 is again brought into coincidence with the median line of the harrow and the line of draft coincides with the center of load. Any deviation of the front and rear harrow sections from their normal position, therefore, brings the force of the draft into play toward restoring the sections to their normal position, and accordingly the draft force is always effective as a stabilizing factor and resists any tendency of the rear harrow section to swing laterally, or to side slip or drift on side hill work. In this connection it should also be noted that when the front harrow section is turned from a straight-away position, the action of the members 14 and 51 causes the center of mass of the rear harrow section to be moved up closer to the front harrow section. This relative forward movement of the rear section of course requires the expenditure of draft force, owing to the resistance of the rear gangs, which gives them a tendency to lag, and consequently whenever the harrow is turned laterally in either direction the resistance of the rear harrow section tends to restore both sections to their straight-away position, and incidentally to swing the members 14 and 51 so as to bring their point of contact to the median line of the harrow, at which time the front and rear sections are farthest apart. It will thus be seen that the force of the draft, together with the ground resistance of the rear harrow section, cooperate to restore the harrow sections to their normal position whenever there is any deviation from such position. The harrow is therefore essentially stable, or not nervous. The degree of curvature of the members 14 and 51 may vary within rather wide limits, but I prefer to use comparatively flat curves because of the greater degree of stability thereby realized.

Registration of the disks of the front and rear sections combined with the stabilizing characteristics above described is best obtained by making the curved contacting surfaces of the members 14 and 51 similar arcs of an ellipse, and locating said members so that the point of contact of such surfaces is always equi-distant from the transverse axes of the front and rear harrow sections, and coincides with the median line of the harrow when the harrow sections are in their normal position. By the transverse axis of a harrow section is meant a horizontal line perpendicular to the median line of such section and intersecting the longitudinal centers of the two gangs constituting such section. Obviously when the harrow sections are in their normal position, for straight-away work, their transverse axes are parallel, and to secure registration the front and rear sections should be so connected that whenever they deviate from a straight-away or parallel position, as in rounding curves or turning corners, both sections swing through the arc of a circle the axis or center of which is determined by the point of intersection of their respective transverse axes projected, and the radius of which may be measured along either of said transverse axes from such center to the center of the median line of either harrow section. By making the curved surfaces of the members 14 and 51 similar arcs of an ellipse, and locating said members so that their point of contact when the harrow sections are in their normal position is midway between the front and rear transverse axes of said sections, such midway position will not be affected by lateral shifting of their point of contact incident to turning or lateral swinging of the harrow sections, as such point of contact will move along a line substantially bisecting the angle of convergence of said sections. The movement of said sections requisite to maintain registration will therefore be brought about, and, at the same time, as such movement of the point of contact is inverse, i. e., away from the point of convergence when the sections are moved from a position of parallelism, or in the opposite direction when they are moved toward a position of parallelism, the line of the draft applied to the rear section is shifted in the proper direction to maintain stability, as hereinbefore described. I wish it to be understood, however, that although the best results as to maintaining registration are obtained by the equi-distant positioning of the point of contact as above described, considerable variation is permissible where a high degree of accuracy is not required, and therefore my invention is not limited to mathematical exactness in that respect. From the foregoing it will be manifest that the members 14 and 51 constitute controlling means which functions to pivotally connect the front and rear harrow sections together so that the rear section is drawn through the front section and, while angling of said sections is permitted, they are held relatively to each other so that the disks of corresponding front and rear gangs always maintain registration whether the harrow be moving straight ahead or be making a turn, or the rear section otherwise be caused to swing laterally relatively to the front section, and that said controlling means also functions to cause the point of application of the draft to the rear section to move laterally relatively to the line of advance when the rear section swings laterally, or when the harrow sections are angled relatively to each other in making a turn, such lateral movement of the point of application of the draft being in a direction inverse to that of the turn, so that the draft acts directly to restore the sections to parallel relation to each other, as well as to resist angling of the harrow sections when they are parallel.

Up to this point the parts described are the same as those shown and described in the said Hand application, and such construction is not separately claimed as of my invention, which, as has been suggested, has to do with improved means for holding the curved members 14 and 51 in proper working relation to each other under ordinary operating conditions, and also to hold said members together in backing the harrow. For this purpose one of the members 14 or 51, preferably the latter is provided centrally with a rearwardly projecting block 52 fixedly secured thereto by bolts 53, as best shown in Fig. 5, so that its longitudinal center line lies in the median line of the rear unit. The block 52 is in general wedge shaped, its side margins being similarly curved in convex form and merging to a blunt point at the rear where said block is provided with a lug 54 which extends upward above the horizontal plane of the curved bar 14. The upper surface of the block 52 lies immediately under said bar and it projects between two guide plates 55, 56 secured to the curved member 14 at opposite sides of the block 52 and in the same horizontal plane as said block. The forward inner margins of the guide plates 55, 56 are beveled, as shown at 57 in Figure 5, so that the space between said guide plates flares toward the front, the purpose of which is to allow space for the block 52 to swing laterally, as indicated in Fig. 5.

The normal position of these parts is shown in Fig. 2, from an inspection of which it will be seen that when the front and rear units are in position for straight-away work, at which time the centers of the members 14 and 51 are in contact with each other, the longitudinal axis of the block 52 lies in the median line of the harrow, and its side margins bear against the inner margins of the guide plates 55, 56 at diametrically opposite points. At this time the lug 54 lies some distance back of the rear margin of the member 14, as shown in Fig. 2. When the parts are in this position, the members 14, 51 are held against endwise movement relatively to each other by the engagement of the block 52 with the guide plates 55, 56, but rocking of said members on each other is not interfered with by said parts. If the harrow be backed, the backing power will be applied to the front unit and will cause the member 14 to move back away from the member 51 until said member 14 strikes the lug 54, which will prevent further separation of said members and cause the rear unit to move rearwardly thereafter with the front unit. When the harrow units are angled relatively to each other, as indicated for example in Fig. 5, the block 52 will be drawn forward relatively to the member 14 and guide plates 55, 56, and will swing between said guide plates to one side or the other, as illustrated in said figure. During this movement of the block 52 it still continues to hold the members 14, 51 against relative endwise movement, since one margin of said block engages one of the guide plates, as 55, and the other margin of said block engages the other guide plate, as clearly shown in said figure. This rocking movement of the block 52 moves the lug 54 toward the member 14, but said block is located so that when the parts are in normal position it lies far enough back of the member 14 so that the necessary fore and aft movement of said block is permitted to allow the block 52 to rock to the desired extent. It will be understood, of course, that the curvature of the side margins of the block 52 should be correlated with that of the members 14 and 51, so that proper contact between the several bearing surfaces in the different positions which the parts assume will be maintained. It is not necessary, however, that the members 52, 55 and 56 be fitted together with a high degree of accuracy, as so long as such parts cooperate to prevent any considerable relative endwise movement of the members 14 and 51 that is all that is necessary.

While I prefer to make the bearing surfaces of the members 14 and 51 elliptical, that is not necessary, as they may be variously curved, and an important advantage of providing for holding said members against relative endwise movement by the devices above described is that by that means a wider range of variation in the curvature of the members 14 and 51 is permitted.

In the harrow illustrated the side bars 12, 13 are preferably cross-connected by a transverse brace 58 and by a pair of crossed braces 59, 60, as best shown in Fig. 2, thereby strengthening the front draft frame. It will be understood that the rear gangs 10, 11 are mounted so as to be angularly adjustable in the same manner as the front gangs, and while such adjustment has nothing to do with the novel features which form the subject matter of this application, it may be explained that the gangs 10, 11 are mounted to swing about vertical pivots 61, said pivots being mounted in the end portions of the rear frame 9. Angular adjustment of said gangs is effected by means of bars 62 pivotally connected with the inner end portions of said gangs, and also connected with the end portions of a transverse frame 63 arranged to slide longitudinally on bars 64 secured to the members 49, 50 of the rear frame, as shown in Figs. 1, 4 and 5. Preferably the bars 62 extend over stirrups 65, 66 secured to the frame 63, as shown in Fig. 1. The frame 63 is movable fore and aft to correspondingly move the inner ends of the gangs 10, 11 by means of a screw-threaded shaft 67 held against longitudinal movement by a plate 68, shown in Fig. 4, and working in a threaded sleeve 69 carried by the frame 63. The forward end of the shaft 67 is connected by a universal coupling 70 with a rod 71 that extends forward, and preferably through the screw-threaded shaft 40 in which it turns freely and is movable longitudinally to compensate for the fore and aft movement of the rear section relatively to the front section incident to turning movements of the harrow, as herinbefore described, the forward end of said rod 71 being provided with a crank 72 by which it may be rotated. The shaft 67 serves not only to adjust the angular position of the rear gangs, but also holds them in position when adjusted. Any other suitable means may, however, be employed for adjusting the several gangs angularly, as my invention contemplates the application of the improvements hereinbefore described by which registration and stability are obtained to any of the various forms of tandem disk harrows comprising front and rear sections flexibly coupled together, regardless of differences in design of such harrows in other respects.

What I claim as my invention and desire to secure by Letters Patent, is—

1. A tandem disk harrow comprising front and rear disk-carrying units, and draft frames coupling said units together to permit lateral swinging thereof with respect to each other about points lying between the transverse axes of said units and actuated by movement of said transverse axes toward or from a position of parallelism to shift the point of application of the draft to the rear unit inversely laterally, and means rigid with one of said draft frames and engaging the other draft frame to prevent substantial endwise movement of said frames relatively to each other.

2. A tandem disk harrow comprising front and rear disk-carrying units, and draft frames coupling said units together to permit lateral swinging thereof with respect to each other about points lying between the transverse axes of said units, means actuated by movement of said transverse axes toward or from a position of parallelism to shift the point of application of the draft of the rear unit inversely laterally, and means rigidly connected with the frame of one of said units and engaging the frame of the other unit to prevent substantial endwise movement of said frames relatively to each other.

3. A tandem disk harrow having front and rear disk-carrying units arranged to be angled relatively to each other, draft connections between said units comprising means actuated by movement of the transverse axes of said units from a position of parallelism to move said rear unit toward said front unit and to shift the line of the draft applied to the rear unit laterally away from the point of convergence of said transverse axes projected, and means rigid with one of said draft connections and engaging the other draft connection to prevent substantial transverse movement thereof relatively to each other.

4. A tandem disk harrow having front and rear disk-carrying units arranged to be angled relatively to each other, transversely rocking coupling devices between said units connected with said rear unit forward of their connection with the front unit for shifting the line of draft applied to the rear unit inversely laterally when said units move angularly relatively to each other, and means rigidly connected with one of said coupling devices and engaging the other coupling device to prevent substantial transverse movement of said coupling devices relatively to each other.

5. A tandem disk harrow comprising a front disk-carrying unit, a rearwardly extending frame connected therewith, a rear disk-carrying unit having a forwardly extending frame, said units being adapted to be angled relatively to each other, front and rear draft members fixedly mounted respectively on said rear and front frames and actuated by lateral swinging of said units to shift the point of application of the draft to the rear frame laterally in a direction opposite to that in which said units swing, and means rigidly connected with one of said draft members and engaging the other draft member to prevent substantial endwise movement of said frames relatively to each other.

6. A tandem disk harrow comprising a front disk-carrying unit, a rearwardly extending frame connected therewith, a rear disk-carrying unit having a forwardly extending frame, said units being adapted to be angled relatively to each other, oppositely curved rocker bearings carried by said frames respectively, the rocker bearing carried by the front frame being in rear of that carried by the rear frame, and means rigidly connected with one of said rocker bearings and engaging the other rocker bearing to prevent substantial endwise movement of said rocker bearings relatively to each other.

7. A tandem disk harrow comprising a front disk-carrying unit, a rearwardly extending frame connected therewith, a rear disk-carrying unit having a forwardly extending frame, said units being adapted to be angled relatively to each other, oppositely curved rocker bearings carried by said frames respectively, the rocker bearing carried by the front frame being in rear of that carried by the rear frame, and a block rigidly connected with one of said rocker bearings and guided by the other rocker bearing for preventing substantial endwise movement of said bearings relatively to each other.

8. A tandem disk harrow comprising a front disk-carrying unit, a rearwardly extending frame connected therewith, a rear disk-carrying unit having a forwardly extending frame, said units being adapted to be angled relatively to each other, oppositely curved rocker bearings carried by said frames respectively, the rocker bearing carried by the front frame being in rear of that carried by the rear frame, and a block rigidly connected with one of said rocker bearings and adapted to rock between fixed guides carried by the other rocker bearing to prevent substantial endwise movement of said bearings relatively to each other.

9. A tandem disk harrow comprising a front disk-carrying unit, a rearwardly extending frame connected therewith, a rear disk-carrying unit having a forwardly extending frame, said units being adapted to be angled relatively to each other, oppositely curved rocker bearings carried by said frames respectively, the rocker bearing carried by the front frame being in rear of that carried by the rear frame, a block rigidly connected with the front rocker bearing and projecting rearwardly therefrom, and guiding means carried by the rear rocker bearing and cooperating with said block to prevent substantial endwise movement of said rocker bearings relatively to each other.

10. A tandem disk harrow comprising a front disk-carrying unit, a rearwardly extending frame connected therewith, a rear disk-carrying unit having a forwardly extending frame, said units being adapted to be angled relatively to each other, oppositely curved rocker bearings carried by said frames respectively, the rocker bearing carried by the front frame being in rear of that carried by the rear frame, a block rigidly connected with the front rocker bearing and projecting rearwardly therefrom, said block having oppositely disposed convex side margins, and guiding means carried by the rear rocker bearing and cooperating with said block to prevent substantial endwise movement of said rocker bearings relatively to each other.

11. A tandem disk harrow comprising front and rear disk-carrying units, and draft frames coupling said units together to permit lateral swinging thereof with respect to each other about points lying between the transverse axes of said units and actuated by movement of said transverse axes toward or from a position of parallelism to shift the point of application of the draft to the rear unit inversely laterally, means rigid with one of said draft frames and engaging the other draft frame to prevent substantial transverse movement of said frames relatively to each other, and means for holding said draft frames approximately together when the harrow is backed.

12. A tandem disk harrow having front and rear disk-carrying units arranged to be angled relatively to each other, draft connections between said units comprising means actuated by movement of the transverse axes of said units from a position of parallelism to move said rear unit toward said front unit and to shift the line of the draft applied to the rear unit laterally away from the point of convergence of said transverse axes projected, means rigid with one of said draft connections and engaging the other draft connection to prevent substantial transverse movement thereof relatively to each other, and means for holding said units approximately together when the harrow is backed.

13. A tandem disk harrow having front and rear disk-carrying units arranged to be angled relatively to each other transversely rocking coupling devices between said units connected with said rear unit forward of their connection with the front unit for shifting the line of draft applied to the rear unit inversely laterally when said units move angularly relatively to each other, means rigidly connected with one of said coupling devices and engaging the other coupling device to prevent substantial transverse movement of said coupling devices relatively to each other, and means for holding said units approximately together when the harrow is backed.

14. A tandem disk harrow comprising front and rear disk-carrying units, and draft frames coupling said units together to permit lateral swinging thereof with respect to each other about points lying between the transverse axes of said units and actuated by movement of said transverse axes toward or from a position of parallelism to shift the point of application of the draft to the rear unit inversely laterally, and means rigid with one of said draft frames and engaging the other draft frame to prevent substantial endwise movement of said frames relatively to each other and to hold said coupling devices approximately together when the harrow is backed.

15. A tandem disk harrow comprising a front disk-carrying unit having a rearwardly extending frame, a rear disk-carrying unit having a forwardly extending frame, said units being adapted to be angled relatively to each other, oppositely curved rocker bearings carried by said frames respectively, the rocker bearing carried by the front frame being in rear of that carried by the rear frame, and means rigidly connected with one of said rocker bearings and engaging the other rocker bearing to prevent substantial endwise movement of said rocker bearings relatively to each other and to hold said rocker bearings approximately together when the harrow is backed.

16. A tandem disk harrow comprising a front disk-carrying unit having a rearwardly extending frame, a rear disk-carrying unit having a forwardly extending frame, said units being adapted to be angled relatively to each other, oppositely curved rocker bearings carried by said frames respectively, the rocker bearing carried by the front frame being in rear of that carried by the rear frame, and a block rigidly connected with one of said rocker bearings and guided by the other rocker bearing for preventing substantial endwise movement of said bearings relatively to each other, said block having a lug for preventing excessive separation of said rocker bearings when the harrow is backed.

CHARLES H. WHITE.